Patented May 11, 1954

2,678,257

UNITED STATES PATENT OFFICE 2,678,257

ACTIVATED URANIUM DIOXIDE AND PROCESSES OF PRODUCING THE SAME

Milton J. Polissar, San Francisco, Calif., assignor to the United States of America as represented by the United States Atomic Energy Commission No Drawing. Application July 13, 1943,
Serial No. 494,448

3 Claims. (Cl. 23—14.5)

The present invention relates to activated uranium dioxide and processes of producing the same.

Commercial $UO_2$ is ordinarily in the form of a chocolate brown powder and is very stable in ordinary air at room temperature. In fact, this product exhibits no tendency to oxidize in ordinary air until it is heated to a temperature of the order of 100° C., under which conditions it is oxidized to the black oxide $U_3O_8$ in accordance with the following reaction:

$$3UO_2 + O_2 \rightarrow U_3O_8$$

This reaction is only normal in view of the fact that commercial $UO_2$ is ordinarily prepared by the reduction of $UO_3$ or $U_3O_8$ with H.

While this great stability of commercial $UO_2$ considerably simplifies the problem of storage prior to use it is believed to represent a surface characteristic that is responsible for the stability of this product in ordinary air at room temperature. Also, it is thought that this characteristic of commercial $UO_2$ accounts primarily for the moderate rate of chlorination of this product with $CCl_4$ vapor at an elevated temperature in order to produce $UCl_4$, as disclosed in the copending application of James M. Carter, Serial No. 490,293, filed June 10, 1943, in which the following specific reactions are carried out:

$$UO_2 + 2CCl_4 \rightarrow UCl_4 + 2COCl_2$$

$$UO_2 + 2COCl_2 \rightarrow UCl_4 + 2CO_2$$

The present invention is predicated upon the discovery that $UO_3$ may be reduced with natural gas, consisting essentially of $CH_4$, in order to prepare $UO_2$ and that this product is highly active with respect to commercial $UO_2$ prepared by any known process, including the reduction of $UO_3$ and $U_3O_8$ with H, which represents the most feasible commercial process. It is surmised that this activated form of $UO_2$ has a surface condition that is responsible for its increased activity, but since this fact has not been definitely established it may prove to be a characteristic of the product engendered entirely by virtue of its preparation utilizing natural gas as a reduction agent. In any case, this activated form of $UO_2$ exhibits characteristics so radically different from conventional forms of $UO_2$ that it cannot be maintained that these two forms of this compound are identical except in chemical formula.

For example, ordinary $UO_2$ exhibits no tendency to oxidize in ordinary air at room temperature; whereas the activated form of $UO_2$ is characterized by rapid oxidation under these conditions. Similarly, ordinary $UO_2$ may be chlorinated with $CCl_4$ vapor to produce $UCl_4$ only at a moderate rate; whereas the activated form of $UO_2$ may be rapidly chlorinated with $CCl_4$ vapor to produce the product mentioned.

Accordingly, it is an object of the invention to provide the activated form of $UO_2$.

Another object of the invention is to provide the highly active form of $UO_2$ which is characterized both by rapid oxidation in ordinary air at room temperature and by rapid chlorination with $CCl_4$ vapor at an elevated temperature.

Another object of the invention is to provide the activated form of $UO_2$ which is prepared by reduction of $UO_3$ with natural gas, consisting essentially of $CH_4$.

A further object of the invention is to provide an improved process of producing $UO_2$ utilizing natural gas as a reducing agent.

A further object of the invention is to provide an improved process of producing $UO_2$ which employs the reduction of $UO_3$ with natural gas.

The invention, both as to its organization and method of operation, together with further objects and advantages thereof, will best be understood by reference to the following specification.

In accordance with the present invention, a suitable Kjeldahl flask is first swept clear of air by employing a stream of nitrogen which has been passed through a drying agent such as $H_2SO_4$. A suitable charge of $UO_3$, the bright red powder, is then placed in the flask; the flask is stoppered; and the charge is subjected to a stream of natural gas consisting essentially of $CH_4$. Preferably, the natural gas is first passed through a drying agent such as $H_2SO_4$ before it is admitted through a first tube extending through the stopper into the flask, in order positively to insure that no moisture is transferred to the charge. The flask is then heated by a suitable heater, whereby the charge is reacted. The reaction gases produced, together with the excess natural gas, are conducted from the flask through a second tube extending through the stopper. More particularly, the charge is heated to a temperature within the range 400° to 500° C., the temperature of the charge being maintained as close to 450° C. as is practicable. When the charge of $UO_3$ is thus heated to a temperature within the range mentioned in the presence of a stream of natural gas it is reduced to $UO_2$ in accordance with the following reaction:

$$4UO_3 + CH_4 \rightarrow 4UO_2 + CO_2 + 2H_2O$$

The reaction gases, including $CO_2$ and water vapor, are swept from the flask by the excess natural gas, whereby the $UO_2$ produced is substantially completely dry and is in the form of a chocolate brown powder. The process is continued until the charge of $UO_3$ is completely converted into $UO_2$.

*Example*

When the process is carried out employing a charge of $UO_3$ of 100 grams the charge is substantially completely reduced to produce approximately 94 grams of the product $UO_2$ in approximately one hour under the conditions specified.

After the charge of $UO_3$ has been converted into the product $UO_2$ the flask is detached and transferred to a dry cabinet containing an atmosphere of $CO_2$ before it is opened in view of the fact that the product $UO^2$ is highly reactive with ordinary air at room temperature, the product being capable of ready oxidation and evolving a great deal of heat when exposed to ordinary air. The product $UO_2$ is bottled in an atmosphere of $CO_2$ or in a vacuum and sealed for future use. The product $UO_2$ so produced is particularly well suited for use in the process of producing $UCl_4$ disclosed in the previously mentioned copending application of James M. Carter.

While analyses clearly indicate that this product produced in accordance with the present process has the chemical formula $UO_2$ it is apparent that this product is in a highly active state and, in fact, constitutes activated $UO_2$. This fact is readily evidenced by the special properties of the activated $UO_2$ as contracted with the ordinary properties of commercial $UO_2$. For example, this activated $UO_2$ is rapidly oxidized in ordinary air at room temperature, producing $U_3O_8$; whereas commercial $UO_2$ exhibits no oxidation in ordinary air until it is heated to a temperature of the order of 100° C. Also, this activated $UO_2$ may be rapidly chlorinated with $CCl_4$ vapor to produce $UCl_4$, as disclosed in the previously mentioned copending application of James M. Carter; whereas commercial $UO_2$ may be so chlorinated only at a moderate rate.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. The process comprising reducing $UO_3$ with natural gas at a temperature within the range 400° to 500° C., whereby pyrophoric $UO_2$ is produced.

2. The process comprising reducing $UO_3$ with $CH_4$ at a temperature within the range 400° to 500° C., whereby pyrophoric $UO_2$ is produced.

3. The process comprising reducing $UO_3$ with a methane-containing gas at a temperature within the range 400° to 500° C., whereby pyrophoric $UO_2$ is produced.

References Cited in the file of this patent

Gmelin-Kraut, "Handbuch der anorganischen Chemie," vol. III, part 1, page 1537, Carl Winters' Universitatsbuchhandlung, Heidelberg (1912). (Copy in Division 59.)

Mellor, "Inorganic and Theoretical Chemistry," vol. XII, pages 40, 42. Longman's, London (1932). (Copy in Div. 59.)

Abegg's "Handbuch der anorganischen Chemie," vol. IV, part 1, second half, page 907. Verlag von S. Hirzel, Leipzig (1921). (Copy in Div. 59.)

Candea, "The Methane Gas of Rumania," Chemical Abstracts, vol. 32, page 9447 (1938). (Copy in Sci. Lib.)